(12) United States Patent
Slowack et al.

(10) Patent No.: US 11,831,974 B2
(45) Date of Patent: Nov. 28, 2023

(54) ZONE-ADAPTIVE VIDEO GENERATION

(71) Applicant: BARCO N.V., Kortrijk (BE)

(72) Inventors: Jürgen Rosa Georges Slowack, Kortrijk (BE); Smriti Jain, Kortrijk (BE); Samuel Johannes Rita Dauwe, Kortrijk (BE)

(73) Assignee: BARCO N.V., Kortrijk (BE)

( * ) Notice: Subject to any disclaimer, the term of this patent is extended or adjusted under 35 U.S.C. 154(b) by 40 days.

(21) Appl. No.: 17/769,616

(22) PCT Filed: Nov. 5, 2019

(86) PCT No.: PCT/EP2019/080292
§ 371 (c)(1),
(2) Date: Apr. 15, 2022

(87) PCT Pub. No.: WO2021/089130
PCT Pub. Date: May 14, 2021

(65) Prior Publication Data
US 2023/0164422 A1      May 25, 2023

(51) Int. Cl.
*H04N 23/611* (2023.01)
*G06T 7/73* (2017.01)
(Continued)

(52) U.S. Cl.
CPC ........... *H04N 23/611* (2023.01); *G06T 7/246* (2017.01); *G06T 7/73* (2017.01); *H04N 5/262* (2013.01);
(Continued)

(58) Field of Classification Search
CPC . H04N 23/611; H04N 21/23418; G06T 7/246
See application file for complete search history.

(56) References Cited

U.S. PATENT DOCUMENTS

| 5,790,124 A * | 8/1998 | Fischer | G06T 15/10 |
| | | | 472/75 |
| 2007/0081080 A1* | 4/2007 | Peterson | H04N 23/66 |
| | | | 348/208.14 |

(Continued)

FOREIGN PATENT DOCUMENTS

KR    1020130106483 A    9/2013

OTHER PUBLICATIONS

International Search Report and Written Opinion issued in PCT/EP2019/080292, dated Sep. 10, 2020.
(Continued)

*Primary Examiner* — Jayanti K Patel
*Assistant Examiner* — Christopher Kingsbury Glover
(74) *Attorney, Agent, or Firm* — HAMRE, SCHUMANN, MUELLER & LARSON. P.C.

(57) ABSTRACT

The present invention provides a system and a method for automatically generating an output video of a presentation given by at least one presenter, comprising a displayed content, and performed in an environment, the system comprising a plurality of zones defined within the environment, at least one camera, wherein the camera is configured to capture image frames of the presentation given by the presenter in the environment, means to detect when the at least one presenter changes zone, a configuration associating to each zone, a set of filming parameters for controlling the at least one camera when the at least one presenter is in said zone, wherein the system if further configured to change the filming parameters when the at least one presenter changes zone based on the configuration associated to the zone in which the at least one presenter is so as to provide an output video to the user with different filming parameters.

19 Claims, 4 Drawing Sheets

(51) Int. Cl.
*H04N 23/90* (2023.01)
*H04N 5/262* (2006.01)
*H04N 21/218* (2011.01)
*H04N 21/234* (2011.01)
*G06T 7/246* (2017.01)

(52) U.S. Cl.
CPC . *H04N 21/21805* (2013.01); *H04N 21/23418* (2013.01); *H04N 23/90* (2023.01); *G06T 2207/10016* (2013.01); *G06T 2207/30196* (2013.01)

(56) References Cited

U.S. PATENT DOCUMENTS

| | | | |
|---|---|---|---|
| 2013/0024819 A1 | 1/2013 | Rieffel et al. | |
| 2015/0373283 A1* | 12/2015 | Hayashi | G06T 3/4038 348/239 |

OTHER PUBLICATIONS

Adib et al., "Multi-Person Localization via RF Body Reflections", included in the Proceedings of the 12th USENIX Symposium on Networked Systems Design and Implementation, May 4-6, 2015, cited in Specification.

Check if a given point lies inside a Polygon, available at https://www.tutorialspoint.com/Check-if-a-given-point-lies-inside-a-Polygon, accessed on Apr. 15, 2022.

CMU-Perceptual-Computing-Lab, available at https://github.com/CMU-Perceptual-Computing-Lab/openpose, accessed on Apr. 15, 2022.

Inpolyhedron—are points inside a triangulated volume?, Sven (2022). inpolyhedron—are points inside a triangulated volume? (https://www.mathworks.com/matlabcentral/fileexchange/37856-inpolyhedron-are-points-inside-a-triangulated-volume), MATLAB Central File Exchange. Retrieved Apr. 15, 2022.

People Tracking using Deep Learning, Priya Dwivedi, Feb. 7, 2019, available at https://towardsdatascience.com/people-tracking-using-deep-learning-5c90d43774be.

[CVPR 2019] Efficient Online Multi-Person 2D Pose Tracking with Recurrent Spatio-Temporal Affinity Fields, Quan Hua, Jul. 2, 2019, https://towardsdatascience.com/cvpr-2019-efficient-online-multi-person-2d-pose-tracking-with-recurrent-spatio-temporal-affinity-25c4914e5f6.

Multiple Object Tracking using Person Re-identification, Quantum, Jan. 14, 2019, https://medium.com/datadriveninvestor/multiple-object-tracking-using-person-re-identification-f9b7360cda1a.

N. Gheissari, T. B. Sebastian and R. Hartley, "Person Reidentification Using Spatiotemporal Appearance," 2006 IEEE Computer Society Conference on Computer Vision and Pattern Recognition (CVPR'06), 2006, pp. 1528-1535, doi: 10.1109/CVPR.2006.223., available at https://ieeexplore.ieee.org/abstract/document/1640938.

Point-in-Polygon Algorithm—Determining Whether a Point is Inside a Complex Polygon, available at http://alienryderflex.com/polygon/ , accessed on Apr. 15, 2022.

Model-Based Localization and Tracking Using Bluetooth Low-Energy Beacons, Sensors 2017, 17, 2484, Oct. 29, 2017.

Target localisation and tracking in a UWB radar network: UWB Indoor Person Tracking, 2017, available at https://www.semanticscholar.org/paper/Target-localisation-and-tracking-in-a-UWB-radar-UWB-Bruinsma-Hill/41fd50e0461dde3c6dfdae32607ea71de238113c?p2df.

* cited by examiner

ZONE-ADAPTIVE VIDEO GENERATION

TECHNICAL FIELD

The present disclosure relates to a system and method for automatically generating an output video of a presentation given by at least one presenter.

BACKGROUND

High-end presentations (e.g., corporate results, keynote speeches at scientific conferences, political events) are often captured and streamed to a remote audience. Due to their importance, such events are typically run by a technical crew behind the scenes, consisting of—among other people—camera operators and a video director. Camera operators apply appropriate framing (e.g., of the presenter, the content, the audience) while the video director decides which of the cameras should be sent to the output video mix streamed out to the remote audience. Obviously, some of these roles can be combined in one person. The end goal is to create a video mix that is aesthetically pleasing while at the same time visualizing the most important information. However, having one or more operators behind the scenes to control the cameras and perform the switching from one camera to the other is expensive and does not scale to the more low-end presentations (e.g., break-out sessions at conferences, lectures/remote teaching . . . ).

Low-end presentations/lectures are typically captured and streamed/recorded without support of a technical crew. As a result, these videos are usually static, captured by a single camera from a perspective that is expected to be most meaningful. This results in a less dynamic/engaging experience, and, in some cases, poor presenter framing as well as poor content visibility (e.g., difficult to read drawings or writings on a whiteboard). This can be disturbing to the remote user/audience, and for lecture presentations, the remote user can miss a lot of important information.

Attempts in automatically capturing such presentations have been made. However, while a human operator has full understanding of the scene, for a computer this level of understanding is still often lacking. As a result, the system may not always focus on the right people in the scene (e.g., it may get confused by random people visualized on a poster or a display), it may visualize clutter in the background, etc.

There is therefore a need for improvement in the art.

SUMMARY

In order to overcome the problems of the prior art, there is therefore provided a system for automatically generating an output video of a presentation given by at least one presenter, comprising a displayed content, and performed in an environment, the system comprising a plurality of zones defined within the environment, at least one camera, wherein the camera is configured to capture image frames of the presentation given by the presenter in the environment, means to detect when the at least one presenter changes zone, a configuration associating to each zone, a set of filming parameters for controlling the at least one camera when the at least one presenter is in said zone, wherein the system if further configured to change the filming parameters when the at least one presenter changes zone based on the configuration associated to the zone in which the at least one presenter is so as to provide an output video to the user with different filming parameters.

The system automatically generates the desired output, without the need of having a crew of people controlling the cameras. The user always visualizes the most appropriate content with the best filming parameters.

Advantageously, the filming parameters comprise the settings used to control the camera or they may also determine that for a certain amount of time, camera X is active, then after N seconds, camera Y becomes active, etc.

Thus, the output video will be constantly changing, which ensures that the viewer remains alert and interested while viewing the output video.

The filming parameters may also determine where the presenter should be in the image, and the camera shooting the scene automatically adjusts itself to provide the best shot of the presenter by changing its PTZ parameters. The filming parameters will then also determine the field size (long shot, full shot, medium shot, close-up, etc.) which can be changed with the zoom parameter of a camera, and camera angle (by changing the pan or tilt movement of the PTZ camera.

Thus, the viewer will always experience the most appropriate output video.

Advantageously, the configuration further associates to each zone an output layout, wherein the output layout determines the composition of the output video comprising at least one of the captured image frames of at least one camera associated to the zone and the displayed content, and wherein the system is further configured to change the output layout when the at least one presenter changes zone based on the configuration associated to the zone in which the presenter is so as to generate an output video having a different output layout.

The output layout is automatically changed when the at least one presenter changes zone which ensures that the viewer always sees useful content to improve user experience. While a presenter for example enters the laptop zone, the content of the laptop may be shown together with the presenter behind the laptop.

Such a system has the following advantages:

- System robustness: even if the system detects people on a poster/display/ . . . or behind the scenes, by defining zones, only people in the zone will be considered important.
- Predictability: a teacher is sure that, when close to the laptop or whiteboard, students will always have a good view on the content being discussed. If necessary, zones could be marked physically on the floor as well as a visual aid for the teacher.
- Simplicity: no additional sensors are required (e.g., depth cameras, Bluetooth sensors . . . ) since the system is using cameras that are also used for visualization.
- This system could also replace a static system (to provide more dynamics) or a system directed by people (to reduce the involvement of labour/cost).

Preferably, the configuration further associates a set of prioritization rules associated to a presenter or a plurality of presenters which define filming parameters and/or an output layout for each zone.

When multiple presenters are giving a presentation, the system needs to know how to film the plurality of presenters, and to which presenter to give priority. This priority may be based on the zone in which the presenter is.

Preferably, the means to detect when the at least one presenter changes zone comprises means to detect at least one person and means to detect in which zone the at least one presenter is at a given image frame.

This is a reliable way to detect when a presenter changes zone.

Advantageously, the given image frame corresponds to an image frame of a plurality of image frames acquired at intervals, preferably regular intervals, which corresponds preferably to a multiple of the acquisition rate of a camera.

By only analyzing 2 to 10 frames per second for example, the computation load is reduced, while the system still reacts sufficiently fast when a presenter changes zone.

Preferably, the zones are two-dimensional, preferably polygons. Polygons are easy to draw. They can be drawn using a drawing tool but also automatically when the system knows the geometry of the environment.

Even more preferably, the zones are three-dimensional, preferably polyhedrons.

Using three-dimensional zones further has the advantage that it can be better mapped to the corresponding zone (e.g., a floor region) in the real world (which is 3D). In case the floor is not visible in the acquired images, due to an obstacle such as a chair, the system is still capable of determining whether the presenter is in the zone or not.

Advantageously, the system comprises at least two zones, of which one is a whiteboard zone defined in the vicinity of the displayed content and one is a main zone, defined in the remainder of the environment.

This setting is the most natural setting which reflects a presentation.

It is an advantage that the system further comprises a laptop zone, defined in the vicinity of the laptop of the presenter.

It is preferred that the field of view of the combination of the at least one camera comprises the entire environment at all times.

This ensures that the combination of all the cameras always monitors the entire environment, and thus ensures that it is capable of detecting when a presenter changes zone.

Preferably, the system comprises two cameras, of which one is configured to provide a view of the presenter in the whiteboard zone and one is configured to provide a view of the presenter in the main zone.

This ensures the most optimal view of the presenter in each zone to the user.

Advantageously, at least one of the cameras is a PTZ camera, or a webcam, etc.

Even more preferably, at least two cameras are PTZ cameras and a third camera is configured to have a field of view which comprises the environment and is used for configuring the zones.

Using PTZ cameras has the advantage that various degrees of freedom of the cameras can be easily controlled, such as the pan, tilt and zoom.

It is an advantage that the configuration of the zones is performed using the configuration. Preferably, the configuration is a configuration interface.

Preferably, the system is configured for live streaming and/or for recording.

Users can either view the output video stream in real time, or it is also possible for the users to have access to the video offline.

Advantageously, the output video stream is sent via internet to remote users in real time.

Preferably, the system further comprises means to communicate with a remote viewer, and at least one monitor which is configured to show the remote viewer assisting to the presentation in real time.

The remote users can thereby assist to the presentation in real time and even interact with the at least one presenter, as in a real classroom, presentation environment or a meeting.

It is an advantage that a microphone and/or loud speakers are further provided in the environment. This enables for example the users to ask questions during the presentation and get direct answers from the at least one presenter.

There is also provided a method for automatically generating an output video of a presentation given by at least one presenter, comprising a displayed content, and performed in an environment with at least one camera, the method comprising the steps of determining a plurality of zones in the environment, configuring for each zone, a set of filming parameters for controlling the at least one camera when at least one presenter is in said zone, capturing image frames of the presentation with the at least one camera, detecting when the at least one presenter changes zone within the environment, changing the filming parameters when the presenter changes zone following the configuration associated to the zone in which at least one presenter is so as to provide an output video to the user with different filming parameters.

This method ensures that the viewer sees an output video which changes while the presenter moves within the environment. The most appropriate settings are always applied for capturing the scene and the viewer is provided with a video which is as if captured by a crew of professional directors.

Advantageously, the method further comprises the step of configuring for each zone an output layout, wherein the output layout determines the composition of the output video comprising at least one of the captured image frames of a camera associated to the zone and the displayed content, and changing the output layout of the output video when the presenter changes zone following the configuration associated to the zone in which the at least one presenter is so as to provide an output video to the user with a changing output layout.

It is an advantage that the output layout automatically changes, such that the user is provided with a video with a changing layout as if a person was mixing the different sources of images to provide the user with the most appropriate content based on where the presenter is in the environment.

The method preferably further comprises the step of determining a set of prioritization rules associated to a presenter of a plurality of presenters which define filming parameters and/or an output layout for each zone.

This ensures that the system knows what to do when a plurality of presenters are in the environment.

Preferably, the zones are two-dimensional, preferably polygons and/or three-dimensional, preferably polyhedron.

Advantageously, the step of detecting when the at least one presenter changes zone comprises the steps of detecting at least one person in a given image frame and detecting in which zone the at least one presenter is in said given image frame. This method is robust to determine when the presenter changes zone, and thereby to provide changes to the output videos.

Preferably, the method further comprises the step of representing a person as a stick figure having a plurality of body keypoints, and extracting the coordinates of the detected body keypoints.

Advantageously, the method further comprises the step of comparing the coordinates of the detected body keypoints with the coordinates of the zones.

Preferably, the method further comprises the step of comparing the coordinates of the body keypoints which represent the feet with the coordinates of the zone, if the feet are not available, comparing the coordinates of the lowest body keypoints available with the coordinates of the zone.

Such a method ensures that the presenter is always detected, even in the presence of obstructions within the environment.

It is an advantage that the method further comprises the step of tracking the at least one presenter. Once the presenter has been detected it is possible to track the presenter.

Preferably, the step of tracking the at least one presenter is performed with a plurality of cameras.

There is also provided a user interface for configuring the system described above, wherein the user interface comprises a drawing tool for drawing a plurality of zones (polygon) on top of a given camera view in the environment; a configuration file, said configuration file comprising a look up table which associates to each zone a set of filming rules.

Preferably, the configuration file also comprises a look up table which associates to each zone an output layout.

Preferably, the interface further comprises a configuration file which determines a set of prioritization rules associated to a presenter of a plurality of presenters for each zone.

There is also provided a computer program product comprising software which executed on one or more processing engines, performs any of the methods described above.

There is also provided a non-transitory signal storage medium storing the computer program product.

There is also provided a controller for a system as described above and comprising the non-transitory signal storage medium of above.

BRIEF DESCRIPTION OF DRAWINGS

These and other features, aspects, and advantages of the apparatus, systems and methods of the present disclosure will become better understood from the following description, appended claims, and accompanying drawing wherein:

DESCRIPTION OF EMBODIMENTS

Figure 1:
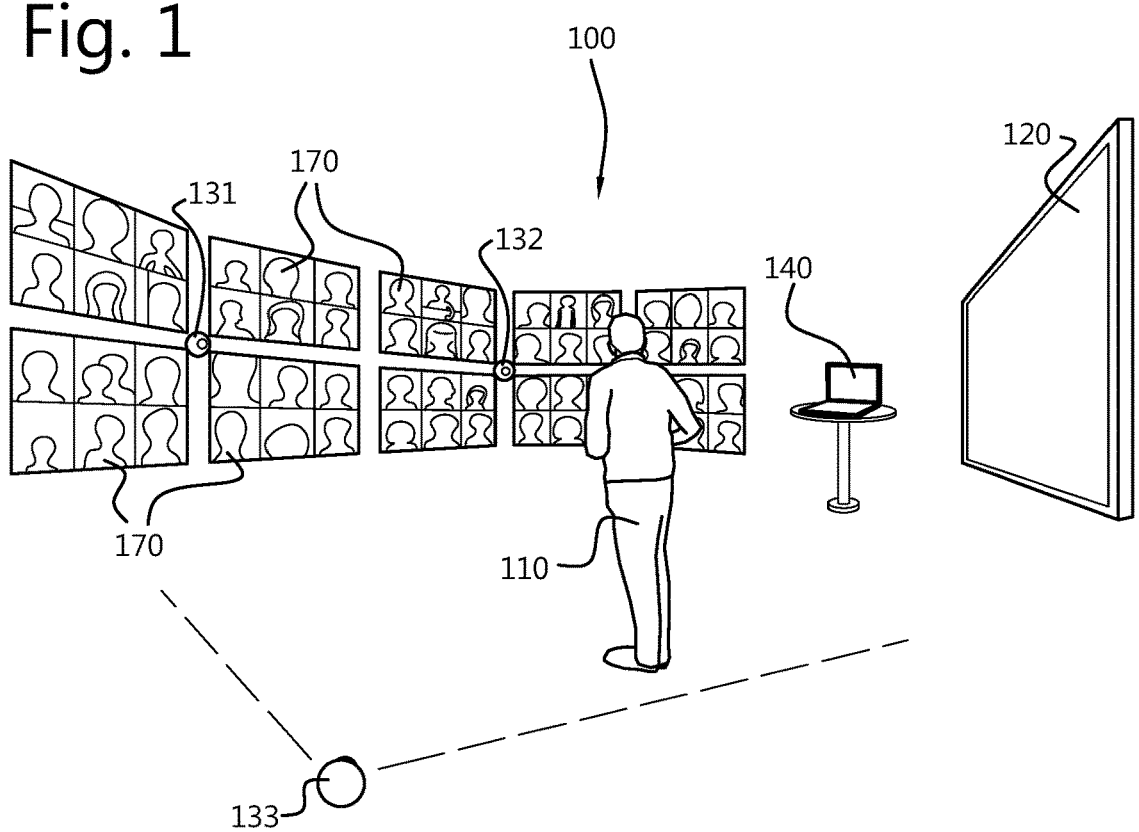
FIG. 1 shows the setting of a virtual classroom in which a presenter is giving a lecture.

Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The terms "about" or "approximate" and the like are synonymous and are used to indicate that the value modified by the term has an understood range associated with it, where the range can be +20%, +15%, +10%, +5%, or +1%. The term "substantially" is used to indicate that a result (e.g., measurement value) is close to a targeted value, where close can mean, for example, the result is within 80% of the value, within 90% of the value, within 95% of the value, or within 99% of the value.

Definitions:

Configuration A configuration is a set of parameters which define the behavior of the system in each zone. The configuration can also be in the form of a configuration file. The configuration can be hard coded in the system, but it can also be defined by the user on a user interface or configuration interface.

Displayed content the content which is being displayed can be digital such as slides but it can also be provided by a non-digital whiteboard (or chalk/blackboard). The displayed content may also be provided by an experiment, such as a chemical reaction or a physical experiment which is being made by the presenter.

Environment The environment is defined by the setting and the infrastructure in a physical space in which the system is to be installed. The dimensions or physical layout of the rooms may delimit the environment, or the field of view of the cameras may also delimit the environment. The zones are then defined within this environment. The infrastructure may further comprise a whiteboard. However, it may also be that instead of a whiteboard, a chemical lab or an experiment table is used within the environment to display content (such as a chemical reaction or a physics experiment).

Filming parameters The filming parameters comprise the settings used to control the camera. These may obey to certain filming rules. For a PTZ camera, the filming parameters determine which PTZ parameters the camera should use. The filming parameters may further determine that for a certain amount of time, camera X is active, then after N seconds, camera Y becomes active, etc. The filming parameters may also determine where the presenter should be in the image, and the camera shooting the scene automatically adjusts itself to provide the best shot of the presenter by changing its PTZ parameters. The filming parameters will then also determine the field size (long shot, full shot, medium shot, close-up, etc.) which can be changed with the zoom parameter of a camera, and camera angle (by changing the pan or tilt movement of the PTZ camera). Auto-tracking may also be considered as a filming parameter and be activated when the presenter is in a certain zone.

Filming rules A set of artistic practices to capture a scene and create an aesthetically pleasing video mixing. A typical best practice in photography, for example, is the use of the rule of thirds to decide where to position objects/people in the image. The filming rules can be implemented in the system with the filming parameters.

Home position The home position corresponds to the position in which a camera is when it is inactive. It may also correspond to a default position in which at least one of the cameras is for setting up the system, such as defining the zones.

Output video The output video is the video which is output from the system and which is being shown to the user. The output video is thus a sequence of frames, wherein the frames show at least one of the image frames captured by at least one camera (potentially varying between different zoom levels) and the displayed content. The output video can be shown in live streaming or can be recorded for later use, or both.

Output layout the output layout determines the composition of each output video frame comprising at least one of the image frames captured by at least one camera and the displayed content.

Presentation the presentation can be any type of presentation such as educational presentations/lectures, corporate presentation, meeting presentations, conference presentation, etc. It can also further include the presentation of an experiment such as a chemical reaction, or a physics experiment, etc.

Prioritization rules When a plurality of presenters are in the environment, the system is configured to be capable of tracking all the presenters. However, the system should know which presenter to show in which situation. Therefore, a set of prioritization rules can further be defined in the configuration of the system, so as to determine which presenter should be shown in the output video frames and with which filming parameters and/or with which output layout.

PTZ camera A camera able to P(an), T(ilt) and Z(oom) typically through mechanical (pan and tilt) and optical (zoom) adjustment.

User interface or configuration interface The user interface is an interface in which the user can insert or modify parameters which determine the behavior of the system in the different zones. It may also include a drawing tool for drawing the zones on top of a camera view for example.

Virtual classroom A teaching environment in which students are attending the lecture remotely (e.g., over the Internet). The teacher is typically in a specifically designed room to facilitate remote teaching (e.g., displays to visualize all students, as well as lecture-related infrastructure such as a digital whiteboard).

Whiteboard A whiteboard is defined throughout the application as a display which may show non-digital content or digital content. For non-digital content, the presenter may even use a blackboard with a chalk or a whiteboard with whiteboard-markers to present the content. When displaying digital content, the whiteboard can be provided by a monitor, or a TV screen (LCD, (O)LED, plasma, etc.), a large touch screen (20 to 108"), or can even be provided by a white wall or white screen on which the digital content is projected by a projector.

Zone A zone is a region defined within the environment. It is preferably defined using a drawing tool superposed on a camera image, when the camera is in its home position. Zones are preferably polygons. The zones can also be three-dimensional, in which case the zones are polyhedrons. For each zone, the system has a different behavior in terms of filming parameters and mixing. The system behavior can be pre-defined in a configuration file or a user interface.

The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

FIG. 1 illustrates a presenter 110 presenting content shown on a display 120 in an environment 100. At least one camera 131, 132, 133 is configured to capture the presentation in the environment 100. The content of the presentation can be outlined by the presenter on a (non-digital) whiteboard during the presentation, or can be provided digitally on a large display. For example, the display may be a large monitor or TV screen (LCD, plasma, (O)LED), or even a large touch screen which can host different applications. One of these applications is a whiteboard app. Another application could be PowerPoint™ to show the slides. It is also possible to project the slides on a wall or projection screen. In this case, the presenter can use a laptop 140 to show the content of the presentation on the whiteboard 120.

The presentation can be given in the framework of a lecture, a conference, a webinar, a corporate meeting, etc. The presentation can be recorded for future use, or can be a live stream. If it is a live stream, a plurality of viewers who are remote can virtually attend the presentation. The plurality of viewers can also appear in the virtual classroom on a plurality of monitors 170 and interact with the presenter. There can also be more than one presenter in the environment.

In order to provide to the viewers the best user experience in live stream or for the recording, the at least one camera 131, 132, 133 is configured to capture the presentation such that the most appropriate content is captured with camera settings adapted to the scene. Thus, on the one hand the system not only provides an automatic capturing system by selecting the most appropriate camera and the most appropriate framing but the system also provides a live mixing of the output video by selecting the most appropriate layout.

Therefore, a plurality of zones 150 are defined within the environment 100. To provide both the virtual director capabilities and the automatic montage (mixing), for each zone, different behaviors of the camera settings and/or the output layout of the output video frames are defined.

Figure 2:
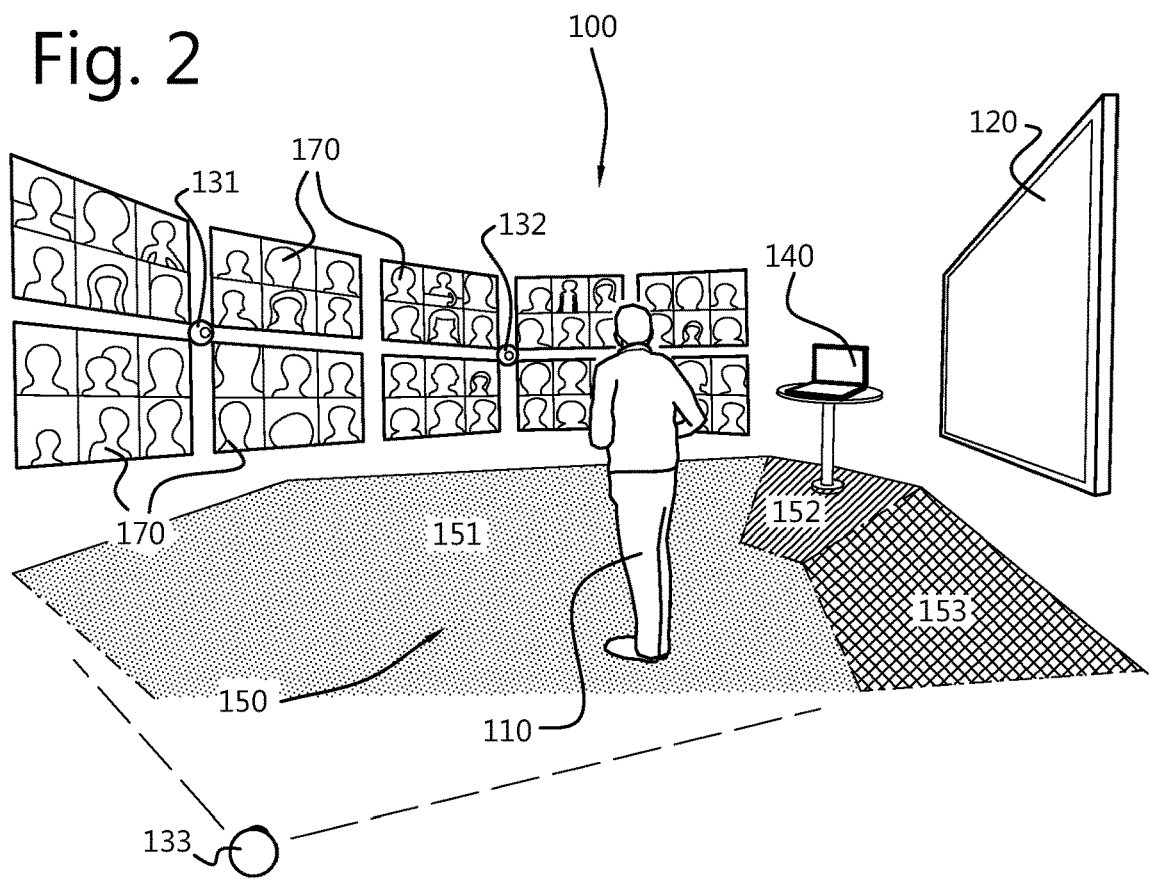
FIG. 2 shows the same virtual classroom as in FIG. 1, but with a plurality of zones defined in the environment.

FIG. 2 shows an example of an environment 150 comprising three zones 151, 152, and 153. The environment of FIG. 2 comprises a main zone 151, a laptop zone 152, and a whiteboard zone 153. Depending on the zone in which the presenter is, the camera settings and/or the output layout of the video frames are adapted to provide the most appropriate layout and views to the users/viewers.

In the main zone 151 for example, the presenter may be moving and providing explanations. In this case, the at least one camera may be configured to provide a general view of the presenter. It may also be that in order to keep the viewer's attention, the scene is captured by a sequence of cameras, i.e. every few seconds a different camera is used to provide a different view to the user (e.g., with a different zoom) to add some dynamics and increase viewer engagement.

In the laptop zone 152, the presenter may be changing slides for example or the presenter may also edit content directly (e.g., writing and compiling computer source code), in which case, only the digital content of the presentation/laptop may be shown in the output video, or a combination of a close-up view on the presenter, and the digital content.

When the presenter is in the whiteboard zone 153, the presenter may be drawing and explaining visuals directly on the whiteboard (e.g., formulas, graphs), in which case the system may be configured to show a close up of the whiteboard and the presenter. If the whiteboard is a non-digital whiteboard on which the presenter is writing, the viewers may benefit of such a close up as the content may not be well visible to them otherwise. This applies as well to a digital white board, and to a large touch screen on which the presenter may be writing directly. The zones depend on the environment in which the system is implemented. In fact, the environment in which the system is installed depends on the infrastructure used, e.g., may be there is no whiteboard but a chemical lab setup instead, for which a fixed camera view needs to be triggered (similar to what is described above as the desired behaviour for the whiteboard zone). Also, the size of the zones will depend on the dimensions of the physical space, and in particular the room architecture.

Therefore, the user can configure the different zones according to the environment but also according to his preferences. As part of a configuration interface for example, a drawing tool can be provided. This drawing tool allows drawing one or more regions or zones on top of a given camera view of the environment. Preferably, the regions are polygons as it is easier to draw and define such shapes within the environment, however any shape is possible.

Using zones has for example the benefit that people shown on a display, a poster or in the background can be ignored by the system. Using zones has also the benefit that it enables the system to support multiple presenters.

Figure 4:
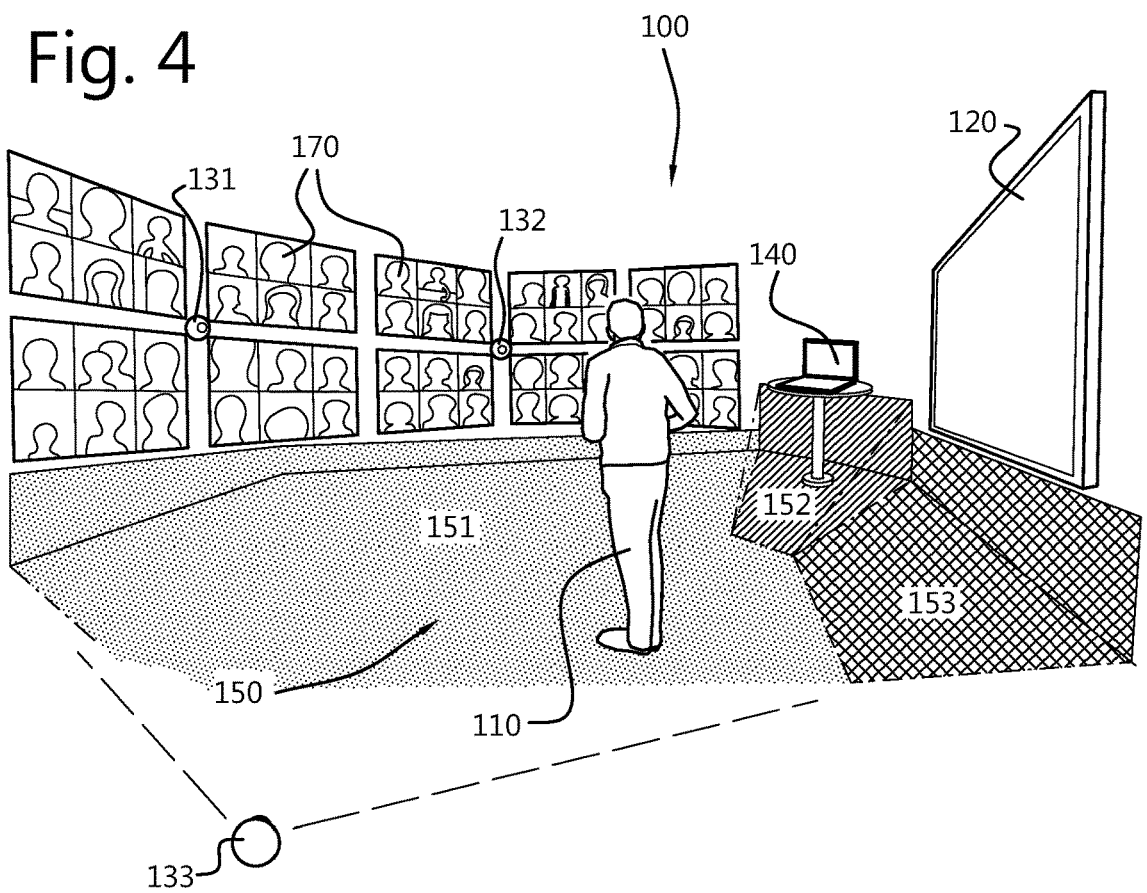
FIG. 4 shows the same virtual classroom as in the preceding Figures, in which the zones are three-dimensional.

The zones may also be three-dimensional, in which case the zones define a spatial volume, i.e. tracking region. With three-dimensional zones, the system becomes even more robust. The body keypoints may also be used, and an additional type of shot, i.e. a "multi-person" shot (such as medium shot or close up) can be defined in the set of "filming rules". This shot could place for example the left-most person at ⅓ of the width and the right-most person at ⅔, for example. Other "filming rules" could be used as well of course to define the multi-person shot. Using three-dimensional zones also has the benefit that it may further limit the tracking to that region only (and avoid showing areas that should not be shown, e.g., background clutter). Using three-dimensional zones further has the advantage that it provides a better mapping to the three-dimensional world. For example, a zone can describe a floor region in the real world, or a volume (e.g., when the floor is not entirely visible because of tables, chairs, or other objects in view). In order to define a three-dimensional zone, a three-dimensional coordinate system which defines where each point in the real world can be found may be used. Once this is defined and the perspective of the camera (and potentially other properties) is known, it is possible to "project" the three-dimensional zone in the real world to pixels in the (two-dimensional) camera images. Thus, the environment can first be mapped into a three-dimensional coordinate space (in which the user can define zones). It is not required to have a perfect 3D model of the environment and intermediate approximations may be performed. Then, this can further be mapped to the camera pixels. FIG. 4 illustrates 3-dimensional zones, i.e. spatial regions, which extend to the walls.

The zones may also be drawn automatically by using image recognition techniques, such as object detection. Using such techniques, known to the skilled person, a laptop may be automatically identified, the whiteboard may also be automatically identified. Using the positions of the cameras and the walls in the room (which can also be automatically identified), it is possible to automatically draw the zones.

It is also possible to use a combination of both, automatic and manual techniques to draw the zones in the environment.

Assuming that the system comprises three cameras, wherein cameras 131 and 132 have a front view of the teacher while camera 133 has a side view (same view as the view provided on the Figures), camera 133 can also be used for drawing and configuring the zones. The coordinates of the regions are therefore known by the system.

In FIG. 2, the cameras 131, 132 having a front view of the teacher are provided close to the displays 170, such that the viewers 170 (or the students) have the impression that the presenter 110 is directly looking at them, so as to improve the user experience.

The system further comprises means to detect in which zone the presenter is. The aim is to detect when the presenter changes zone, so as to change the filming parameters or output layout as soon as a change occurs. In other words, the aim is to determine if the presenter is in a different zone in comparison to a previous image frame.

It is not necessary to analyze every image frame, given the high frame rate of existing cameras. For example, if the frame rate of the video (sent by the cameras to the system) is 30 frames per second, analyzing only 10 frames per second, or even 5 frames per second (or even less) would be sufficient. It is not required to have a regular interval between each frame which is analyzed by the system, although a regular frame rate is easier to implement.

According to the zone in which the presenter is, the most appropriate settings are applied. The means to detect in which zone the presenter is may be provided by localization using radar, depth or infrared cameras. The presenter may be wearing a tag or device that facilitates localization. Bluetooth/Wi-Fi localization may also be used. However, some of these techniques may not be accurate enough. Furthermore, additional hardware is required.

Therefore, an accurate method which is also easy to implement using the system is to use image processing techniques on the images acquired by at least one of the cameras. Such image processing techniques include person tracking. (http://witrack.csail.mit.edu/witrack2-paper.pdf, https://pdfs.semanticscholar.org/41fd/50e0461dde3c6dfdae32607ea71de238113c.pdf, https://www.ncbi.nlm.nih.gov/pmc/articles/PMC5713487/)

Figure 3:
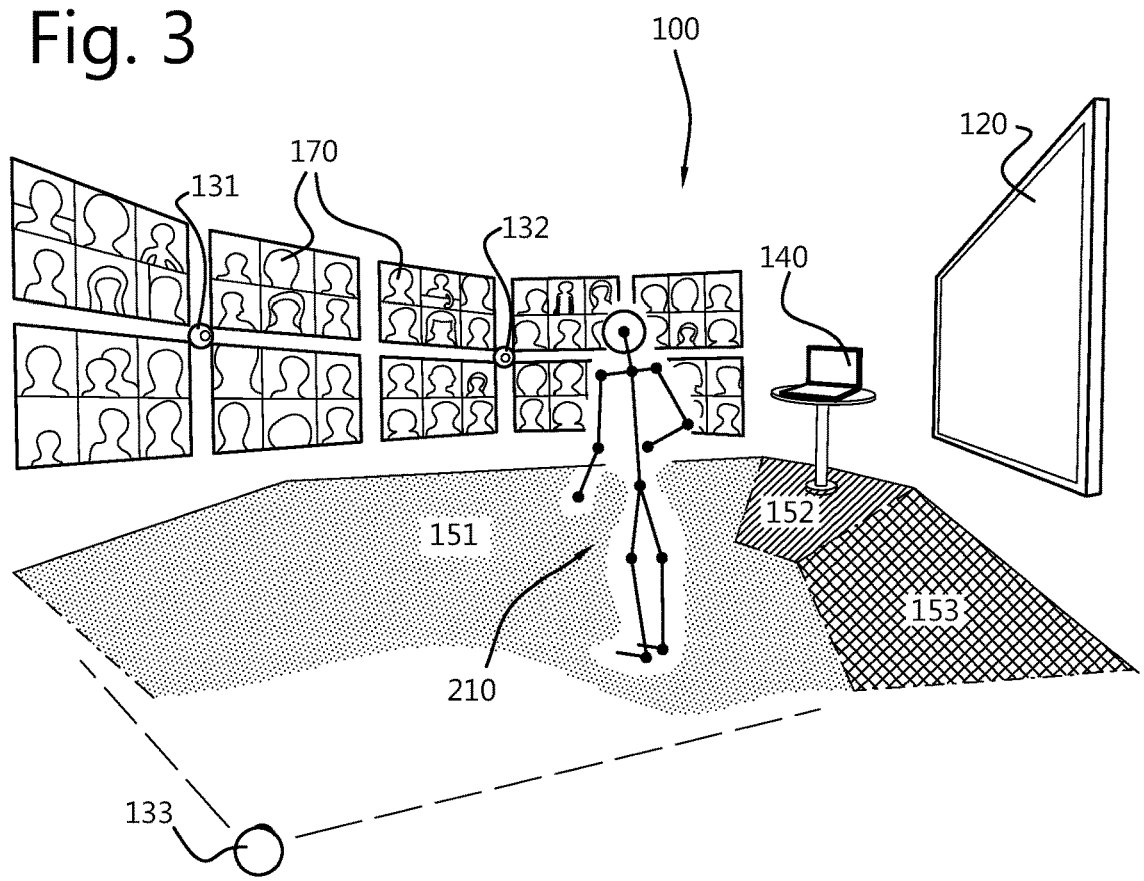
FIG. 3 shows the same virtual classroom as in FIGS. 1 and 2 with the presenter being represented using (skeleton-like) body keypoints.

In the example of FIG. 3, the video stream from camera 133 (in this example) is analyzed using existing techniques for person detection. Using image processing techniques, the person is represented as a stick FIG. 210 having a plurality of body keypoints (also called body joints), as illustrated in FIG. 3. The coordinates of the detected body joints of the person 210 are provided by the algorithm. These coordinates can for example be expressed in x, y format relative to the video frame of a given camera, where x is a value between 0 and 1 in the horizontal direction and y is a value between 0 and 1 in the vertical direction. Other representations are also possible. Using the coordinates of the polygon regions/zones defined in the previous step, and the coordinates of the joints of the person, it is possible to determine whether the person (i.e. presenter) is "inside" a zone or not.

First, it is advantageous to identify in which zone the feet of the presenter are. Thus, the coordinates of the presenter's feet vs. each zone are compared. If cameras are installed in a way where the presenter's feet are not visible, the system may use the lowest body joints which are detected by the system, such as the knees of the presenter instead of the feet and determine if it lies within one of the polygon regions or not.

Different techniques can be used to detect if a 2D point lies within a polygon or not, see for example from the following links:
 https://www.tutorialspoint.com/Check-if-a-given-point-lies-inside-a-Polygon
 http://alienryderflex.com/polygon/
The same applies to three-dimensional:

In 3D, the body coordinates in 3D are first required (some methods exist, such as https://github.com/CMU-Perceptual-Computing-Lab/openpose). Once the coordinates are extracted, different techniques exist to calculate if the point lies in a three-dimensional volume or not, such as described in: https://www.mathworks.com/matlabcentral/fileexchange/37856-impolyhedron-are-points-inside-a-triangulated-volume Preferably, the means to detect in which zone the presenter is, can further be configured to detect multiple presenters.

For example, to be able to track multiple presenters simultaneously, the system may further need to be able to detect people in an image frame and find their counterparts in a previous image frame. This can be performed by using the teachings of
 https://towardsdatascience.com/people-tracking-using-deep-learning-5c90d43774be for example, or
 https://towardsdatascience.com/cvpr-2019-efficient-on-line-multi-person-2d-pose-tracking-with-recurrent-spatio-temporal-affinity-25c4914e5f6
 https://medium.com/datadriveninvestor/multiple-object-tracking-using-person-re-identification-f9b7360cda1a For example, if there were 2 people in a previous image frame from a given camera, and in a current frame there are 3, using such a tracking capability offers the possibility to decide who among these 3 people was also present in the previous image frame (and where).

The previous image frame does not need to be a neighbouring frame but could be "older". For example, a camera with a video frame rate of 30 frames per second could be analyzed at a frequency of only 2 frames per second (in other words, all other 28 frames per second are not analyzed for people).

The configuration of the system can further comprise a set of parameters to determine the system behaviour in the case of multiple presenters. As an example, when two presenters are in two different zones, a set of priority rules could be implemented to dictate the control of the system, i.e., which camera should be used, with which parameters, when which presenter is in which zone, etc. For example, let's assume one person is in the whiteboard zone and the other presenter in the main presenter zone. The output layout could contain a fixed shot of the presenter in front of the whiteboard—with good framing so that the whiteboard is readable—and a medium shot of the other presenter with a camera that follows this presenter automatically if he walks around in the main presenter zone. Another example of prioritization could be, if more than one person is in the main zone, for example visualize all of them. If the persons are in different zones, give priority to the whiteboard zone, then the laptop zone, then the main zone for example.

Thus, for example if two presenters are in different zones:
1. One presenter in zone A and one presenter in zone B->zone A may have priority over zone B, therefore the presenter in zone A is visualized and the other one is not. If there would be more presenters in zone A they are all visualized, but the one in zone B still is not.
2. Another variant configuration could be that the output mix shows a certain shot of all presenters in zone A, next to a different shot of the presenters in zone B.

In addition to person detection, it is possible as well to provide person tracking.

A first case where person tracking can be used is for example when applying the "filming rules". For example, a camera is currently in home position and detects that a person is in zone A. Next, it is instructed to zoom in and visualize the person in a medium shot. At that point, since the camera is zoomed in, it has lost the overview and may not "see" the zones anymore. As a result, when analyzing a new image frame, if more than one person is detected, it has to figure out which of these people corresponds to the person that the camera was tracking in the previous frame. This is not only relevant in a multi-person use case. If there is a cardboard with a person on it, or a person visible on a screen, since the camera does not have the overview it cannot select the person that is in the zone to ignore the other ones in the background. So it has to compare the persons detected with the one that was identified as the presenter in a previous image frame. Typically, the person for which the keypoints are at similar locations (relative to the image frame) will be considered the matching person. One way to overcome some of these problems is to find a way to "extrapolate" the zones from the Home position to other PTZ parameters. In other words, even when not in the Home position the camera is still configured to estimate if the person is in the zone or not. Additional logic is therefore implemented since in zoomed-in views not all body keypoints can be detected, so some extrapolation/estimation of these keypoints would be necessary.

A second, different scenario where tracking can be used by the system is in a multi-presenter case. Even when in Home position, there is an edge case where a person in zone A moves to zone B and the person in zone B moves to zone A in the same image frame. If the system only performs person detection, it will assume that nothing changed compared to the previous frame (because there is still one person in zone A and one in zone B). To overcome this, the system again is configured to match body keypoints between two sets of image frames ("person tracking").

It is to be clarified that "person tracking" and "camera tracking" are different. When "Person tracking" is used, the camera does not necessarily move, in contrary to "Camera tracking" wherein the camera moves to keep a person in view (or multiple persons) according to the filming rules. This can of course only happen with the input from the person tracking logic.

Preferably, each camera has a home and/or reset position which is defined in such a way that the entire tracking region of the camera is covered in said position. Preferably, the drawing tool used to define the zones is used in said position.

When a camera is not live (not being used for the output video stream), it goes to the Home position. Preferably, at least one camera is in the Home/Reset position at all times to effectively monitor the scene.

When the camera is in the Home position, it is configured to perform the following actions:
Track all people=detecting people in the current image frame N of the camera and finding their counterparts in a previous image frame M,
Determine if people are part of a zone for image frames N and M,
  A person could be considered part of a zone if the averaged x and y coordinates of the person's feet are in that zone.
  Other strategies include (but are not limited to):
    If a person was considered part of zone A in frame M, the person could be considered part of a new zone B (different from A) only if both feet are in zone B.
    Other alternatives include considering body joints other than the feet to define a person's location, or other coordinates such as a person's centroid . . .
Trigger an event if there is a change w.r.t. people present in a certain zone, for example, compared to image frame M, in frame N a person has entered or left a zone.
The event contains information about the new state, in specific, the number of people present per zone (e.g., "1 person in laptop zone, no people in other zones", or "2 people in main presenter zone, no people in other zones")
The virtual director system listens to these events, and decides if the output video mix needs to be changed or not.
  First, the virtual director system retrieves the zone configuration to be used. Zones could have different priorities, in the sense that if a person is present in zone A, people present in other zones are not visualized explicitly and only the configuration (and corresponding layout) associated with zone A is considered. Assume in the next steps that zone A indeed corresponds to the configuration to be used.
  Given the configuration to be used, the virtual director system determines if the current shot from the live camera is compliant with this configuration.
    If yes, no action is strictly required.
    If the currently live shot is not compliant, the virtual director forces a change:
      First, among the set of available options provided by the given zone configuration, the virtual director (e.g., randomly) selects the camera and shot to use in the live video output.
      If the desired action for a camera is to adjust to a pre-configured PTZ setting (e.g., as defined through the configuration interface), that camera can directly adopt the desired shot.
      Otherwise:
        If the camera selected is currently in the Home position, and the polygon area for zone A is defined for this camera and position, the virtual director can directly send the desired shot information to the camera and request it to go live. For example, the command could be to visualize all people in this zone from the hip upwards (if possible). Since the camera is in the Home position, and has zone A defined, it is detecting all people in this zone and is able to identify the people to be visualized.
        If the camera selected is currently not in the Home position or does not have zone A defined, additional information may need to be sent to identify the people to be visualized (e.g., when multiple people are present). This information could be in the form of spatial coordinates (e.g., using calibration techniques so that people visible in one camera can be mapped to their counterparts in another cameras, for example see https://www.epfl.ch/labs/cvlab/research/research-surv/research-body-surv-index-php/), in the form of person-related features (e.g., color histograms of a person, clothing attributes, for example as described in the publication by N. Gheissari et al. "*Person Reidentification Using Spatiotemporal Appearance,* 2006 *IEEE Computer Society Conference on Computer Vision and Pattern Recognition* (*CVPR'06*), New York, N.Y., USA, 2006, pp. 1528-1535. doi: 10.1109/CVPR.2006.223), or any other form allowing person re-identification.

Thus, as described above, the user typically configures the zone(s) in one specific camera view (home position), i.e., at given P(an), T(ilt), and Z(oom) parameters. When the camera accommodates different shot types (e.g., close up, medium shot . . . ) for generating a pleasing dynamic experience for the remote participants, the information about the configured polygon coordinates is not immediately available for these different PTZ values. In that case, various strategies can be considered:
  1. Use camera calibration techniques to derive the conversion function from polygon coordinates relative from one set of PTZ values to a different set of PTZ values. Such calibration techniques could use SIFT, ORB, or other types of features, for example, found as part of the environment's background texture. By tracking these feature points while PTZ parameters are varied one could establish the desired conversion function.
  2. As an alternative approach, when the camera is not at its home position in which the zones were defined, the system could rely on a different camera. This assumes that the same zone is defined in multiple cameras, and that cameras go to their home position when they are not currently used as part of the output layout.

Obviously, this problem does not occur in the case of static cameras without mechanical pan, tilt, and zoom, as in such cases the entire view is always available.

A second problem is that part of a zone may be occluded for a given camera. The straightforward solution here is to define the zone in a different camera, and if possible, to fine tune the physical position of the camera to minimize occlusion.

As described above, a configuration interface may be used to configure the different zones within the environment, according to the geometry/arrangement of the environment but also according to the user preferences.

The configuration interface may also be used to configure the system behavior, to increase robustness and predictability from the side of the at least one presenter. This interface will typically be operated when the system is installed for the first time on site. The person operating the interface could be a technical engineer, the presenter itself, or any other person.

The configuration comprises a set of parameters triggered through an API call from within the configuration interface where the zones are defined within the system. The configuration will comprise (1) the zone coordinates (i.e. polygon coordinates) associated with each zone defined for a given camera, and (2) details on the desired layout. Related to (2), for example, in the laptop zone the configuration could only allow medium shots of the presenter using camera 602. In a different zone, the configuration could allow other types of shots as well as other cameras to be used The system comprises at least one camera. The cameras may be of any type such as webcams, PTZ camera, etc. If a plurality of cameras is used, at least one camera may be configured to have a front view of the presenter. One camera may be configured to provide a side view. One camera or a combination of cameras may be used to determine in which zone a presenter is.

There are different possibilities. For example, only one camera is used to detect when the teacher enters/exits a zone. This camera view doesn't have to be included in the output/layout, it could be used for detection only while the other cameras (and content) are used in the output layout. Another possibility is that different cameras have different perspectives, such that one camera may be able to better detect when a person enters the main zone, while another camera is better able to detect when a person enters the whiteboard zone. In that case the detection is distributed across cameras. Again, what is shown in the output layout of the output video can also be different. The system may be configured to show the view of one of these cameras but also a different image (such as yet another camera, the content, but also a logo or default picture in moments when nothing is to be shown).

Advantageously, the user configures the behavior of the system for each zone. The behavior of the system in each system will determine how the at least one camera is operated and/or how the output video is mounted/mixed with the different inputs to provide the desired output layout.

Considering a presentation in the framework of a lecture, wherein remote students are virtually assisting to the lecture provided by the teacher/presenter, the system configuration could be as follows, considering three cameras 131, 132, 133 as illustrated above:

When the teacher is in the MAIN zone 151:
  The video sent to remote students shows shots from cameras 131, 132, and 133. For example, 10 seconds camera 131, after that 15 seconds camera 132. The system decides how long each camera needs to be shown, as well as the pan-tilt-zoom parameters of each camera (e.g., medium shot/close up/etc.).

Figure 5:
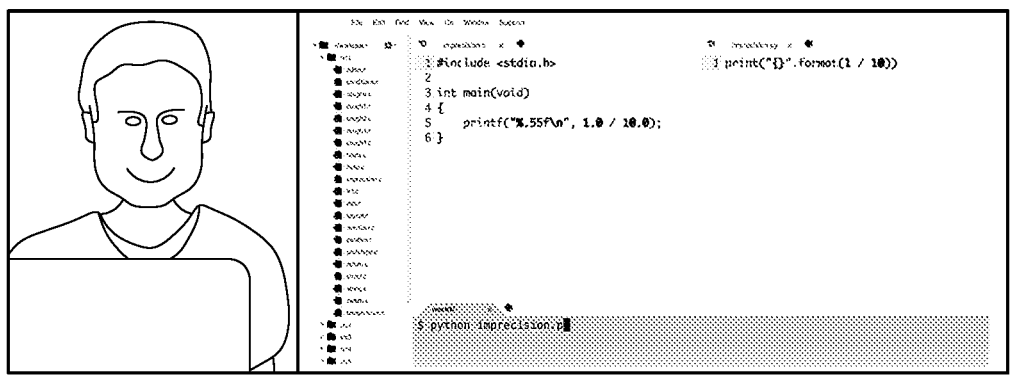
FIG. 5 shows a frame of the output video having an output layout with a view of the user in the laptop zone and the digital content shown on the whiteboard.

When the teacher is in the LAPTOP zone 152:
  The video sent to remote students shows the content of the laptop screen, next to a medium shot of the teacher using camera 132, as shown in FIG. 5.

Figure 6:
FIG. 6 shows a frame of the output video showing the presenter in front of the whiteboard.

When the teacher is in the WHITEBOARD zone 153:
  The video sent to remote students shows the stream from camera 131, at fixed PTZ settings defined by the user during configuration, as shown in FIG. 6.

When the teacher is in none of the regions:
  The video sent to the students can be a slide showing for example the University logo.

Figure 7:
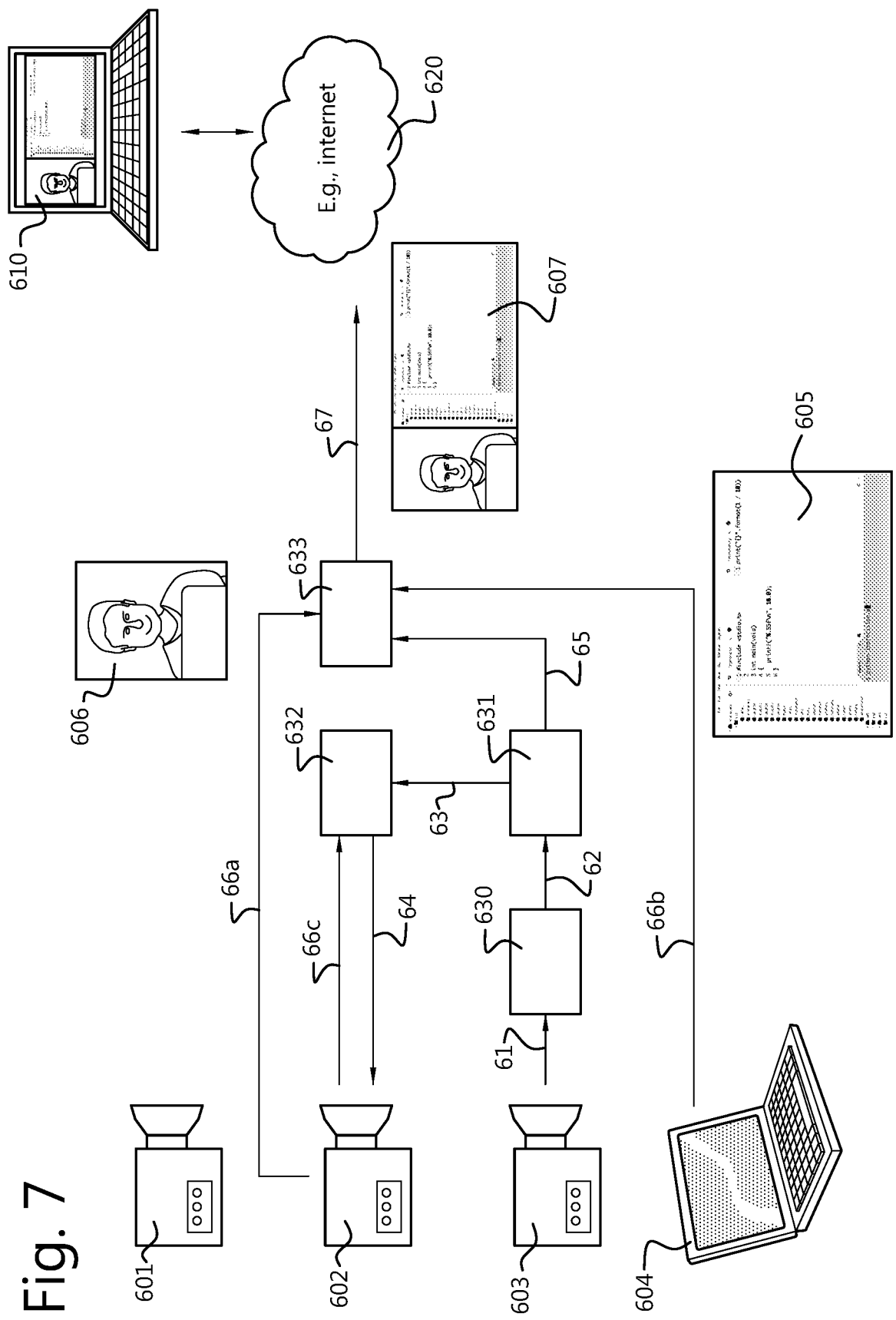
FIG. 7 shows a flow diagram illustrating how the system operates when a presenter enters the laptop zone.

FIG. 7 illustrates a flow diagram which shows how the system behaves when a presenter enters the laptop zone. The system in the example of FIG. 7 is similar to the systems described with reference to FIGS. 1 to 4, i.e. the system comprises three cameras, a white board, one laptop, and three zones are defined within the environment: a whiteboard zone, a main zone and a laptop zone.

The control system comprises a person detection module 630, a zone detection module 631, a camera control module and a video mixer module.

Preferably, the person detection module 630 is configured to receive a video stream from at least one camera and to output body coordinates of at least one person.

The zone detection module 631 is preferably configured to receive body coordinates of at least one person and to determine in which zone the at least one person is.

The camera control module 632 is configured to communicate with the zone detection module 631. Based on the output 63 from the zone detection module 631, and on the configuration of the system, the camera control module 632 is configured to operate at least one camera by sending a command 64 to the proper camera 602 (as defined in the system configuration).

Finally, the video mixer module 633 is configured to generate the output video stream 67 having an output layout based on the output 65 of the zone detection module 631 and on the configuration. It is configured to receive video streams 66a from at least one camera and preferably a video stream 66b from the laptop of the presenter which represents content that is being shown to the viewer. Based on the zone in which the presenter is, the video mixer module 633 generates the output video stream 67 with the proper output layout, as pre-defined in a configuration, for example in a configuration file which is filled by the user during installation, using the user interface or configuration interface. The output video stream 67 is sent (via internet for example) in real-time to the virtual viewers, and/or the output video stream 67 may also be stored for future use and viewing.

The presenter is a teacher giving a lecture for example on a programming language. The presentation can be prepared in advance in the form of slides. In the present example, the presenter/teacher may teach directly from his laptop and show to the students how to use the programming language, as illustrated with image 605 on FIG. 7. In this case, it is advantageous to output from the presenter laptop a video stream 605 comprising the content of the laptop, i.e identical to what is shown on the screen of the presenter's laptop.

When the teacher enters the laptop zone, the following actions occur, to provide the required layout to the remote users on their laptops 610.

In this example, camera 603 is used to define the zones within the environment. Camera 603 is also used in the present example as means for detecting in which zone a person is, as described above.

Cameras 601 and 602 are both used for filming the presenter with different views. In the present example, camera 602 is selected to be in the live output, the control system may—after a certain time, for example, 20 seconds—select camera 601 to adopt a shot of the presenter. After the shot is adopted, a command can be sent to the video mixer module 633 to switch the source in the live output. Additionally, if the presenter leaves the laptop zone, camera 601 could be used more explicitly in the context of other zones.

In the present example, cameras 601 and 602 are PTZ cameras.

1. The video stream 61 is retrieved from camera 603 (for example through HDMI or RTSP over Ethernet/IP).
2. The person detection module 630 is configured to receive video stream 61 and to output body coordinates 62 of the presenter.

3. Using the zone detection module 631 and the body coordinates 62 of the presenter, the system determines in which zone the presenter is. In the current example, the system determines that the teacher is in the LAPTOP zone.
4. Based on the zone in which the presenter is 63, the camera control module 632 may determine which camera to control and determines how to operate it (as defined in the configuration file).
5. The camera control module 632 then sends control commands to the camera 602. In the present example, the camera control module 632 instructs camera 602 to start filming the presenter with a medium shot. PTZ parameters of camera 602 are adjusted to achieve the medium shot of the teacher 606, thanks to video stream 66*c* sent back to the camera control module 632. Thus, person detection and tracking is performed on the video stream 66*c* to figure out if the person is still in view and to potentially move the camera to maintain a good view of the person in accordance with the filming rules.

One method to achieve this is to:
  i. compare the position of the body coordinates of the presenter with respect to desired position as defined for a medium shot in the configuration file under the filming rules,
  ii. adjust PTZ parameters if necessary and return to i until the desired position has been reached.
6. Video mixer module 633 then receives a command to generate an output video stream 607 comprising an output layout defined in the configuration file. In the present example, the output layout comprises the video stream 66*a* from camera 602 and the video stream 66*b* from the laptop 605, such that the output video stream 607 shows in the output layout the content of the laptop 605 and the presenter behind his laptop 606.
7. The video mixer module 633 connects to camera 602 and the laptop 604 to retrieve the video streams 66*a* and 66*b* (e.g., through HDMI or RTSP over Ethernet/IP)
8. The video mixer module 633 combines the two video streams to generate the output video stream 67 and sends the result to the remote students 610 (e.g., using WebRTC 620).

The system described above may be implemented on a main control unit which is configured to run the person detection module, the zone detection module, the camera control module and the video mixer module. The main control unit receives video streams from cameras 601, 602 and 603 and video stream from the laptop used as the displayed content. The main control unit can be connected to internet and is then configured to send the output video stream to the users. A memory can also be used for storing the output video for future use.

The person detection module and the zone detection module may also be combined in the same module, which is configured to determine when a presenter changes zones and trigger an event (a change in the output video stream) based on this event.

Thus, as described above, for each zone (in which the presenter is) a different behavior of the system is provided. The zones determine (1) the layout of the output (i.e., one video stream only, two streams side-by-side . . . ), and (2) the way the system is allowed to change each of the sources in the layout by adjusting camera parameters, for example.

The cameras may also use auto tracking while the presenter moves within a certain zone, for example, auto tracking may be enabled when the presenter is in the main zone.

As described above, the means to detect in which zone the presenter is can be implemented in a plurality of manners. The means to detect in which zone the presenter is could also be described as means to detect when the presenter enters a zone, as it is the change of zone in which the presenter which triggers a new event, and a new control of the cameras, and a new behavior f the system.

It is important to have the following considerations in mind with regard to the operation of the cameras.

In the examples of FIGS. 1 to 4 and 7, the system comprises three cameras, in which one is configured to detect in which zone the presenter is, and two are used to provide different views of the presenter, or the scene. It may be that more than three cameras are used, or less. It may be that the means to detect in which zone a presenter is are provided by more than one camera, and may be performed by a camera which is also active (filming the presenter).

The cameras may be any type, as long as the camera is configured to provide its video stream to the control system. The camera may be a webcam, a PTZ camera, an ePTZ camera or VPTZ camera, When PTZ cameras are used both for detecting when the presenter enters a zone as well as for visualization in the output sent to the remote students (or remote participants in general), additional difficulties may arise.

The system is thus not only configured to provide an output video stream for live video streaming, but it also applies to cases where the output video is recorded.

It is also important to note that a microphone may be provided in the environment for recording the presenter. Furthermore, speakers may also be incorporated in the environment to enable interaction between the presenter and the remote users.

Methods according to the present invention can be performed by a control unit such as a control unit or a processing device or any control unit for use with embodiments of the present invention including microcontrollers, either as a standalone device or embedded in a projector or as part of an optical subsystem for a projector. The present invention can use a processing engine being adapted to carry out functions. The processing engine preferably has processing capability such as provided by one or more microprocessors, FPGA's, or a central processing unit (CPU) and/or a Graphics Processing Unit (GPU), and which is adapted to carry out the respective functions by being programmed with software, i.e. one or more computer programs. References to software can encompass any type of programs in any language executable directly or indirectly by a processor, either via a compiled or interpretative language. The implementation of any of the methods of the present invention can be performed by logic circuits, electronic hardware, processors or circuitry which can encompass any kind of logic or analog circuitry, integrated to any degree, and not limited to general purpose processors, digital signal processors, ASICs, FPGAs, discrete components or transistor logic gates and similar.

Such a control unit or a processing device may have memory (such as non-transitory computer readable medium, RAM and/or ROM), an operating system, optionally a display such as a fixed format display, ports for data entry devices such as a keyboard, a pointer device such as a "mouse", serial or parallel ports to communicate other devices, network cards and connections to connect to any of the networks.

The software can be embodied in a computer program product adapted to carry out the functions of any of the methods of the present invention, e.g. as itemized below when the software is loaded onto the controller and executed on one or more processing engines such as microprocessors, ASIC's, FPGA's etc. Hence a processing device control unit for use with any of the embodiments of the present invention can incorporate a computer system capable of running one or more computer applications in the form of computer software.

The methods described with respect to embodiments of the present invention above can be performed by one or more computer application programs running on the computer system by being loaded into a memory and run on or in association with an operating system such as Windows™ supplied by Microsoft Corp, USA, Linux, Android or similar. The computer system can include a main memory, preferably random-access memory (RAM), and may also include a non-transitory hard disk drive and/or a removable non-transitory memory, and/or a non-transitory solid state memory. Non-transitory removable memory can be an optical disk such as a compact disc (CD-ROM or DVD-ROM), a magnetic tape, which is read by and written to by a suitable reader. The removable non-transitory memory can be a computer readable medium having stored therein computer software and/or data. The non-volatile storage memory can be used to store persistent information that should not be lost if the computer system is powered down. The application programs may use and store information in the non-volatile memory.

In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. Where one claim refers to another claim, this may indicate synergetic advantage achieved by the combination of their respective features. But the mere fact that certain measures are recited in mutually different claims does not indicate that a combination of these measures cannot also be used to advantage. The present embodiments may thus include all working combinations of the claims wherein each claim can in principle refer to any preceding claim unless clearly excluded by context.

While the invention has been described hereinabove with reference to specific embodiments, this was done to clarify and not to limit the invention. The skilled person will appreciate that various modifications and different combinations of disclosed features are possible without departing from the scope of the invention.

The invention claimed is:

1. A system for automatically generating an output video of a presentation given by at least one presenter, the presentation comprising a displayed content; and performance performed in an environment, the system comprising
   a plurality of zones defined within the environment relative to the presentation, wherein the zones are three-dimensional shapes,
   at least one camera, wherein the camera is configured to capture image frames of the presentation given by the presenter in the environment,
   means to detect when the at least one presenter changes zone, wherein the means to detect comprise image processing techniques applied on the acquired image frames by the at least one camera,
   a configuration associating to each zone, a set of filming parameters for controlling the at least one camera when the at least one presenter is in said zone,
   wherein the system if further configured to change the filming parameters when the at least one presenter changes zone based on the configuration associated to the zone in which the at least one presenter is so as to provide an output video to the user with different filming parameters.

2. The system according to claim 1, wherein the configuration further associates to each zone an output layout, wherein the output layout determines the composition of the output video comprising at least one of the captured image frames of at least one camera associated to the zone and the displayed content, and wherein the system is further configured to change the output layout when the at least one presenter changes zone based on the configuration associated to the zone in which the presenter is so as to generate an output video having a different output layout and/or wherein the configuration further associates a set of prioritization rules associated to a presenter of a plurality of presenters which define filming parameters and/or an output layout for each zone.

3. The system according to claim 1, wherein the means to detect when the at least one presenter changes zone comprises means to detect at least one person in an image frame and means to detect in which zone the at least one presenter is in the given image frame.

4. The system according to claim 1, wherein the system comprises at least two zones, of which one is a whiteboard zone defined in the vicinity of the displayed content and one is a main zone, defined in the remainder of the environment.

5. The system according to claim 1, wherein the field of view of the combination of the at least one camera comprises the entire environment at all times.

6. The system according to claim 1, further comprising two cameras, of which one is configured to provide a view of the presenter in the whiteboard zone and one is configured to provide a view of the presenter in the main zone.

7. The system according to claim 1, wherein the configuration of the zones is performed using the configuration, and/or wherein the configuration is a configuration interface.

8. The system according to claim 1, wherein the system is configured for live streaming and/or for recording, and/or wherein the output video stream is sent via internet to remote users in real time, and/or wherein the system further comprises means to communicate with a remote viewer, and at least one monitor which is configured to show the remote viewer assisting to the presentation in real time.

9. A method for automatically generating an output video of a presentation given by at least one presenter, the presentation comprising a displayed content; and performance performed in an environment with at least one camera, the method comprising the steps of
   determining a plurality of zones in the environment relative to the presentation, wherein the zones are three-dimensional shapes,
   configuring for each zone, a set of filming parameters for controlling the at least one camera when at least one presenter is in said zone,
   capturing image frames of the presentation with the at least one camera,
   detecting when the at least one presenter changes zone within the environment, wherein the detecting is performed using image processing techniques applied on the acquired image frames by the at least one camera, changing the filming parameters when the presenter changes zone following the configuration associated to the zone in which at least one presenter is so as to provide an output video to the user with different filming parameters.

10. The method according to claim 9, further comprising the step of configuring for each zone an output layout, wherein the output layout determines the composition of the output video comprising at least one of the captured image frames of a camera associated to the zone and the displayed content, and changing the output layout of the output video when the presenter changes zone following the configuration associated to the zone in which the at least one presenter is so as to provide an output video to the user with a changing output layout.

11. The method according to claim 10, further comprising the step of determining a set of prioritization rules associated to a presenter of a plurality of presenters which define filming parameters and/or an output layout for each zone.

12. The method according to any claim 10, wherein the step of detecting when the at least one presenter changes zone comprises the steps of detecting at least one person in a given image frame and detecting in which zone the at least one presenter is in said given image frame.

13. The method according to claim 12, further comprising the step of comparing the coordinates of the body keypoints which represent the feet with the coordinates of the zone, if the feet are not available, comparing the coordinates of the lowest body keypoints available with the coordinates of the zone.

14. The method according to claim 12, further comprising the step of tracking the at least one presenter.

15. An interface for configuring the system of claim 1, the user interface comprising a drawing tool for drawing a plurality of zones on top of a given camera view in the environment;

a configuration file, said configuration file comprising a look up table which associates to each zone a set of filming rules.

16. The interface according to claim 15, the user interface further comprising a configuration file, said configuration file comprising a look up table which associates to each zone an output layout.

17. The interface according to claim 15, further comprising a configuration file which determines a set of prioritization rules associated to a presenter of a plurality of presenters for each zone.

18. A non-transitory signal storage medium storing a computer program product comprising software which when executed on one or more processing engines, performs a method for automatically generating an output video of a presentation given by at least one presenter, the presentation comprising a displayed content and performance performed in an environment with at least one camera, the method comprising the steps of:

determining a plurality of zones in the environment relative to the presentation, wherein the zones are three-dimensional shapes, configuring for each zone, a set of filming-parameters for controlling the at least one camera when at least one presenter is in said zone, capturing image frames of the presentation with the at least one camera, detecting when the at least one presenter changes zone within the environment, wherein the detecting is performed using image processing techniques applied on the acquired image frames by the at least one camera, changing the filming parameters when the presenter changes zone following the configuration associated to the zone in which at least one presenter is so as to provide an output video to the user with different filming-parameters.

19. A controller comprising the non-transitory signal storage medium of claim 18 for a system for automatically generating an output video of a presentation given by at least one presenter, the presentation comprising a displayed content, and performance performed in an environment, the system comprising:

a plurality of zones defined within the environment relative to the presentation wherein the zones are three-dimensional shapes, at least one camera, wherein the camera is configured to capture image frames of the presentation given by the presenter in the environment, means to detect when the at least one presenter changes zone, wherein the means to detect comprise image processing techniques applied on the acquired image frames by the at least one camera, a configuration associating to each zone, a set of filming parameters for controlling the at least one camera when the at least one presenter is in said zone, wherein the system if further configured to change the filming parameters when the at least one presenter changes zone based on the configuration associated to the zone in which the at least one presenter is so as to provide an output video to the user with different filming parameters.

* * * * *